(12) United States Patent
Hawkins, Jr. et al.

(10) Patent No.: US 8,973,464 B2
(45) Date of Patent: Mar. 10, 2015

(54) HOUSING WITH A DIRECT FLOW PATH FOR HARDWARE LUBRICATION

(75) Inventors: Glen S. Hawkins, Jr., Indianapolis, IN (US); Brian Schoolcraft, Crawfordsville, IN (US)

(73) Assignee: Allison Transmission, Inc., Indianapolis, IN (US)

(*) Notice: Subject to any disclaimer, the term of this patent is extended or adjusted under 35 U.S.C. 154(b) by 82 days.

(21) Appl. No.: 13/206,826

(22) Filed: Aug. 10, 2011

(65) Prior Publication Data

US 2012/0039554 A1    Feb. 16, 2012

Related U.S. Application Data

(60) Provisional application No. 61/373,465, filed on Aug. 13, 2010.

(51) Int. Cl.
*F16H 57/04* (2010.01)
*F16N 31/00* (2006.01)
*F16C 33/66* (2006.01)
*F16C 35/04* (2006.01)

(52) U.S. Cl.
CPC ............ *F16N 31/00* (2013.01); *F16C 33/6659* (2013.01); *F16C 35/042* (2013.01)
USPC ...................................................... 74/606 R

(58) Field of Classification Search
USPC ........ 74/606 R; 184/13.1, 104.2; 384/93, 462
See application file for complete search history.

(56) References Cited

U.S. PATENT DOCUMENTS

| | | | | |
|---|---|---|---|---|
| 2,998,287 A | * | 8/1961 | Pritchett | 384/466 |
| 7,635,225 B2 | * | 12/2009 | Lajiness | 384/472 |
| 2008/0112660 A1 | * | 5/2008 | Koch et al. | 384/397 |

FOREIGN PATENT DOCUMENTS

| | | |
|---|---|---|
| JP | 04-249658 | 9/1992 |
| JP | 10-096463 | 4/1998 |
| JP | 2009-041589 | 2/2009 |
| JP | 2009-138898 | 6/2009 |
| JP | 2009138898 A * | 6/2009 |

OTHER PUBLICATIONS

International Search Report & Written Opinion for International Patent Application Ser. No. PCT/US2011/47215; Pub. Date Apr. 9, 2012.
International Preliminary Report on Patentability and Written Opinion; by the International Bureau of WIPO; Feb. 19, 2013.
Korean Intellectual Property Office (KIPO), Notice to Submit Response, Mar. 21, 2014.

* cited by examiner

*Primary Examiner* — Vicky Johnson
(74) *Attorney, Agent, or Firm* — Taft Stettinius & Hollister, LLP; Stephen F. Rost

(57) ABSTRACT

The present invention provides a housing that encloses a bearing. The housing includes a side wall upon which a lubricant is dispersed. The side wall has a sloped portion and a collection area is fluidly associated with the side wall. A fluid circuit is integral with the side wall such that the fluid circuit is configured to direct the lubricant into the collection area.

34 Claims, 4 Drawing Sheets

HOUSING WITH A DIRECT FLOW PATH FOR HARDWARE LUBRICATION

RELATED APPLICATIONS

This application claims priority to U.S. Provisional Patent Application Ser. No. 61/373,465, filed Aug. 13, 2010, which is hereby incorporated by reference in its entirety.

BACKGROUND

The present invention relates to a cast housing, and in particular to a cast housing of a transmission with an improved fluid path for lubricating a bearing.

A conventional transmission can include an outer cast housing that encloses gears, shafts, clutches, friction/reaction plates, variators, planetary gear sets, bearings, etc. The outer cast housing can be formed by a plurality of housings connected to one another. During operation, the internal components of the transmission can reach extreme temperatures and therefore require a means for cooling. A bearing, for example, requires a lubricant to be applied or sprayed into contact therewith in order to maintain the temperature of the bearing below a certain threshold. Once the bearing temperature exceeds the threshold, the bearing can fail causing potential damage to the transmission and negatively affecting its operation.

There are several conventional ways in which a bearing or other internal component is lubricated. One such way, for example, is to apply lubrication to the bearing before it is installed or assembled in the transmission. However, over a period of time the bearing needs additional lubrication, particularly if the bearing temperature reaches an extreme temperature. Therefore, a conventional transmission can include a plurality of lube circuits integrated therein. A pump can supply a lubricant to a plurality of lube circuits in the transmission. For example, a shaft can be drilled with lube holes to allow a lubricant to pass therethrough and provide sufficient lubrication to bearings and other internal components.

The lubricant can be a transmission fluid such as TranSynd™, which is a synthetic oil formulated by Castrol Ltd. One skilled in the art may know of other types of lubricants. During operation, the amount of torque and power generated by a transmission can put a significant amount of stress on a shaft in the transmission. This stress can limit the quantity and location of lube circuits formed in the shaft. In such instances, a bearing that would ordinarily be lubricated by a lubricant passing through a lube hole in the shaft may be lubricated in an alternative manner. Often times, the bearing may not receive enough lubrication and eventually fail, or the transmission may need to be redesigned such that more lubricant reaches the bearing. Alternatively, the bearing may need to be relocated inside the transmission where a nearby lube circuit is provided. In other designs, lubricant is directed through lube circuits which indirectly supply lubrication to the bearing. Again, the bearing may not receive enough lubrication and eventually overheat and/or fail.

Therefore, a need exists for a cast housing with an improved lube path integrated therein for providing sufficient lube to a bearing enclosed within the housing, particularly when a lube path cannot be integrally formed in a shaft.

SUMMARY OF THE INVENTION

In one exemplary embodiment of the present invention, a housing is provided that encloses a bearing. The housing includes a side wall upon which a lubricant is dispersed. The side wall has an angularly disposed portion. The housing also includes a collection area that is fluidly associated with the side wall. A fluid circuit is integrated with the side wall such that the fluid circuit is configured to direct the lubricant into the collection area. The collection area can be fluidly coupled to the bearing. In addition, the collection area and angularly disposed portion can be formed on opposite sides of the side wall.

In one embodiment, a transmission includes a bearing and a fluid source configured to provide fluid to the bearing. The transmission also includes a housing that encloses the bearing and fluid source. The housing has a side wall that defines a front face and a rear face such that the front face is opposite the rear face. The side wall is configured to receive fluid from the fluid source. The housing also includes a surface angularly disposed from the front face of the side wall and a collection area formed between the rear face of the side wall and the bearing. The collection area is fluidly associated with the surface and configured to collect fluid. A fluid circuit is defined along the front face and the surface and is configured to direct the fluid into the collection area.

In another embodiment, a housing for providing lubrication to a bearing includes a wall upon which a lubricant is dispersed. The wall has a first portion and a second portion such that the second portion is sloped from the first portion. The housing further includes a means for collecting the lubricant. The means for collecting is disposed adjacent to the bearing. The housing also includes a means for directing the lubricant from the wall to the means for collecting. The means for directing is fluidly associated with the means for collecting.

In a different embodiment, a method of lubricating a bearing in a housing of a transmission is provided. The housing includes a side wall that is defined by a first portion and a second portion. The second portion of the housing is angularly disposed from the first portion. The housing further includes a recessed portion defined between the side wall and the bearing. The method includes applying a lubricant to the side wall and directing the lubricant from the first portion to the second portion of the side wall. The lubricant is collected in the recessed portion and the bearing is lubricated with the collected lubricant. The method can further include guiding the lubricant along the first portion of the side wall.

An advantage associated with the various embodiments described above is the ability to provide sufficient lubrication to the bearing without providing a lube circuit through a shaft, particularly when doing so would weaken the shaft. Instead, the housing defines the lube circuit. A portion of the housing is angularly disposed such that the lubricant is directed to a collection area. As the lubricant is received in the collection area, the lubricant collects therein and provides the necessary amount of lubrication required to maintain the bearing temperature at a reasonable level.

Another advantage is the housing defines a direct lube path to the bearing. In other conventional lube circuits, the lube path is indirect and an insufficient amount of lubricant reaches the bearing. As described above, this causes an undesirable condition as the bearing can overheat and fail. In the above-described embodiments, however, the lube circuit defined by the housing receives the lubricant from a source and guides the lubricant to the collection area directly. As a result, a sufficient amount of lubricant is collected in the collection area to lubricate the bearing.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
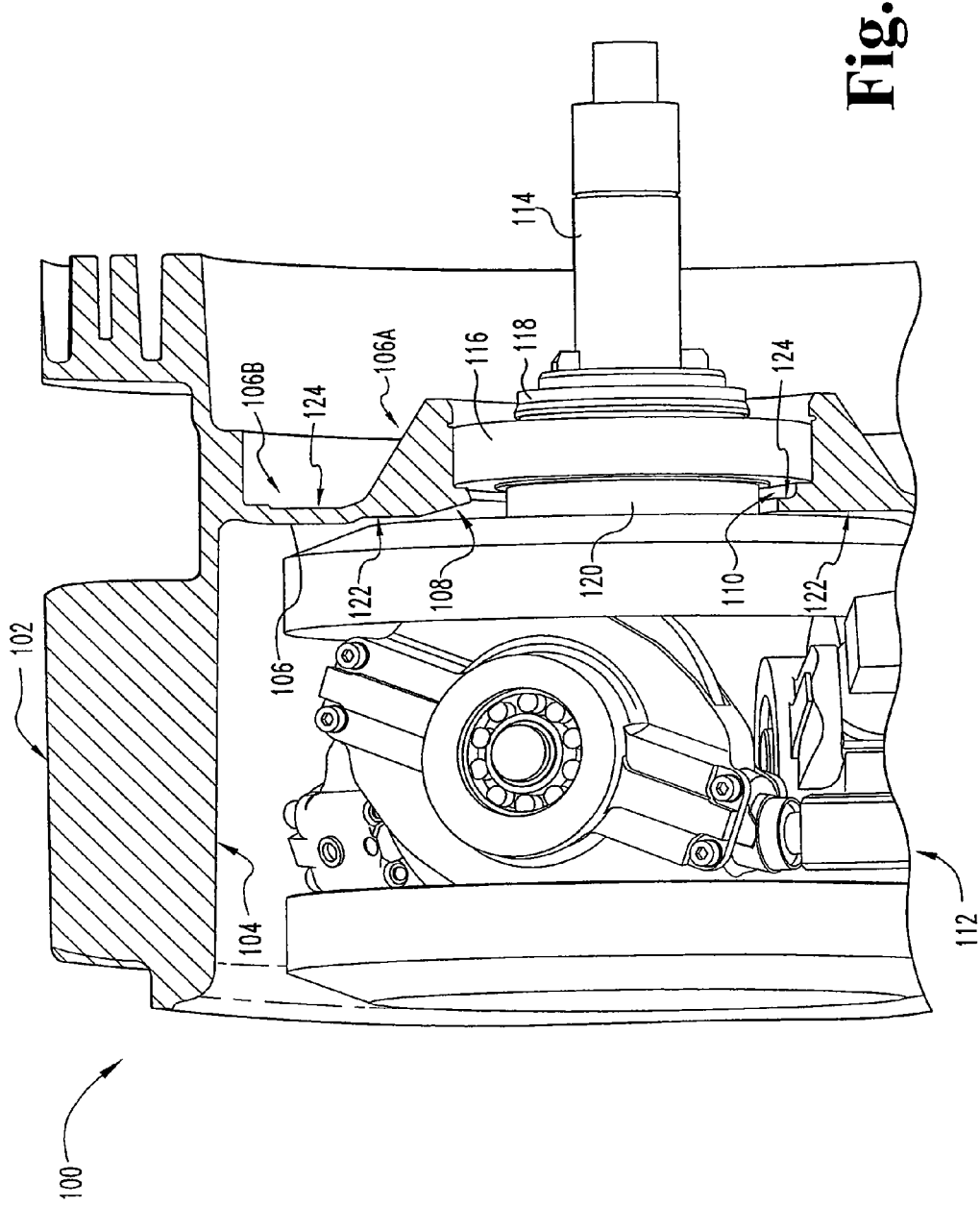
FIG. 1 is a partial side elevation and cross-sectional view of a portion of a transmission housing with an improved lube passage.

An exemplary embodiment of a housing 102 is shown in FIG. 1. The housing 102 can be any housing (e.g., engine, valve, etc.), but in this embodiment the housing 102 is part of a transmission 100 for a powered vehicle. In particular, the housing 102 can provide an enclosure for electrical and mechanical components. The housing 102 defines a plurality of walls that form the enclosure. The housing 102 can be formed of cast aluminum or any other metallic material. Alternatively, in another embodiment, the housing can be formed of a plastic or resin material. One skilled in the art can appreciate other materials from which the housing 102 can be formed.

As described above, the housing 102 in FIG. 1 is an outer housing or main case of the transmission 100. The housing 102 defines an inner wall 104 that encloses internal components. The housing 102 can define one or more inner walls 104 such that the overall enclosure is conical, cylindrical, frustoconical, cubical, or any other shape known to the skilled artisan. Other walls, e.g., side walls, can integrally be formed with the inner wall 104. For example, in the embodiment of FIG. 1, a side wall 106 is formed near the top and bottom of the housing 102. The side wall 106 is substantially perpendicular with respect to the inner wall 104 and protrudes radially inward therefrom. The thickness of the side wall 106 can vary along its length. For instance, in FIG. 1, a first portion 106A of the side wall 106 has a greater thickness than a second portion 106B disposed adjacent to the inner wall 104.

The change in thickness of the side wall 106 can be attributed to the size and location of the electrical or mechanical components in contact with or in close proximity of the side wall 106. In the illustrated embodiment, the housing 102 can at least partially enclose a variator 112, a shaft 114, a bearing 116, a retaining nut 118, and a bearing pilot 120. The housing 102 can also enclose additional components that are not shown. Although a variator 112 is shown in FIG. 1, a pump or other fluid source can be enclosed within the housing 102. As shown, the bearing pilot 120 is assembled inside the housing 102 and passes through an opening formed in the side wall 106. The opening can be any shape including circular, square, rectangular, oval, etc.

The second portion 106B of the side wall 106 defines a substantially vertical surface that is oriented towards the variator 112. The first portion 106A of the side wall 106, however, defines a surface 108 that is angularly disposed or sloped from the second portion 106B. The surface 108 can be sloped at an angle between 0° and 45°. In one embodiment, the surface 108 is disposed at an angle between 5° and 25°. In an advantageous embodiment, the surface 108 is disposed at about 15°. As shown, the surface 108 is oriented towards the bearing 116.

In the embodiment of FIG. 1, the side wall 106 forms at least two faces. A front face 122 defines surface 108 and is oriented substantially towards the variator 112. On the opposite side, a second face 124 is oriented substantially towards the bearing 116 and retaining nut 118. A collection area 110 (e.g., recess) is formed in the housing 102 and is partially defined by the second face 124. The collection area 110 is adjacent to the bearing 116 such that transmission fluid, for example, can collect or "pool" therein and lubricate the bearing 116. As shown, the cross-section of the collection area 110 is substantially L-shaped to facilitate the passage of fluid to the bearing 116. Although in the embodiment of FIG. 1 the collection area 110 is partially defined by the bearing 116, in other embodiments a different electrical or mechanical component can partially define the collection area 110. In other words, any electrical or mechanical component that can be cooled by a fluid can be used for partially defining the collection area 110. Regardless of the component, however, the housing 102 at least partially defines the collection area 110, and in some embodiments the housing 102 may substantially define the entire collection area 110.

Figure 2:
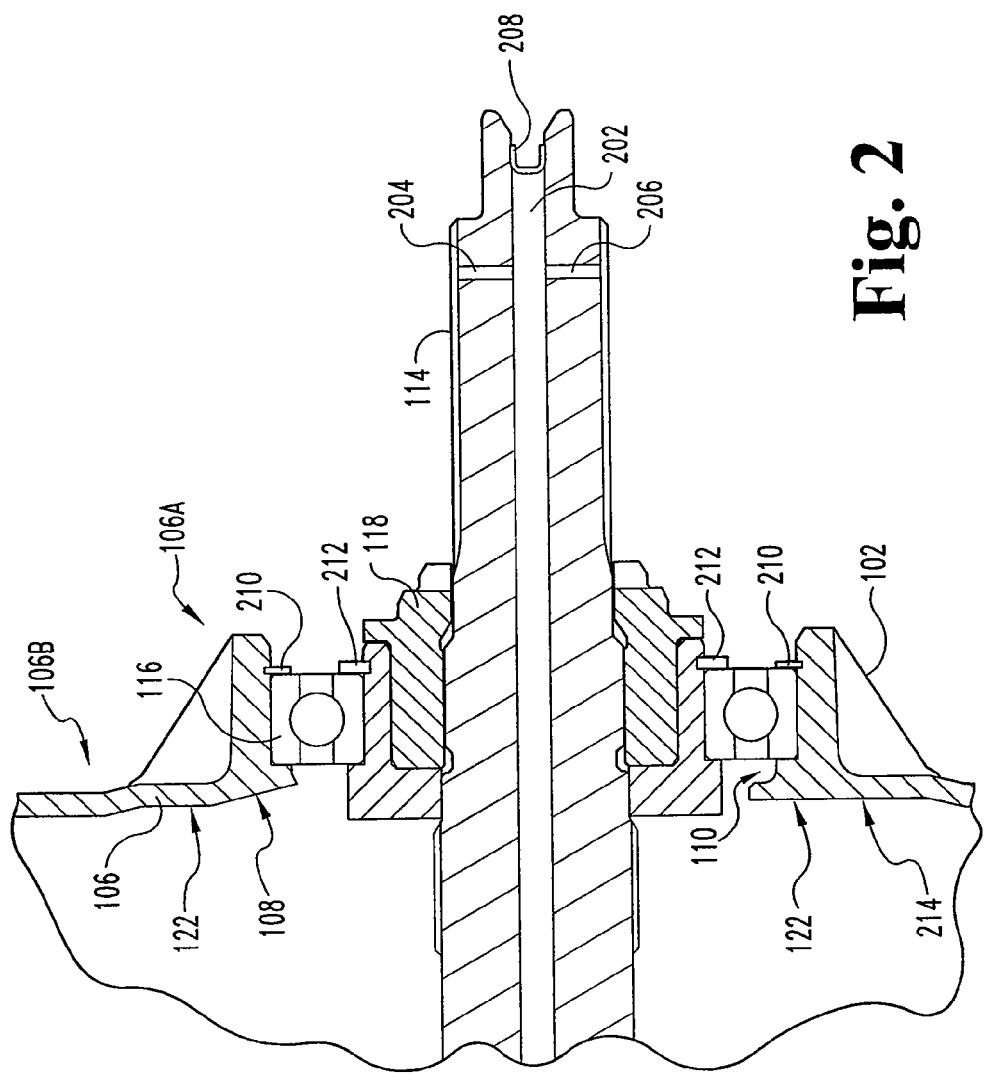
FIG. 2 is a cross-sectional view of the housing of FIG. 1.

In FIG. 2, a plurality of lube passages are shown. For example, the shaft 114 has a central passage 202 through which transmission fluid can travel. In addition, a pair of lube passages 204, 206 are fluidly coupled at one end to the central passage 202 and extend radially outward therefrom. Transmission fluid passing through the central passage 202 is directed through the pair of lube passages 204, 206 because a seal 208 blocks the fluid from exiting through the end of the shaft 114. At the opposite end, the lube passages 204, 206 are unobstructed so that fluid can pass through the central passage 202 and exit through the passages 204, 206. However, any fluid that passes through the central passage 202 and lube passages 204, 206 cannot be directed to the bearing 116. The bearing 116 therefore is unable to be lubricated in this manner.

As described above, conventional lube circuits may include passages in the shaft 114 similar to lube passages 204, 206 that would direct fluid to the bearing. However, in this embodiment, the amount of torque and power exerted on the shaft 114 does not allow lube passages to be formed in the shaft 114 at locations adjacent to the bearing 116. The shaft 114 is weakened by drilling or forming lube passages therein and thus is unable to withstand the stresses during operation. It is also not possible to move the bearing 116 along the shaft 114, as the bearing 116 is held in its location by an outer retaining ring 210 and an inner retaining ring 212. Therefore, a different but direct lube circuit is required to provide lubrication to the bearing 116. The improved housing 102 described above is successful in providing a direct lube circuit with sufficient lubrication for the bearing 116.

Figure 3:
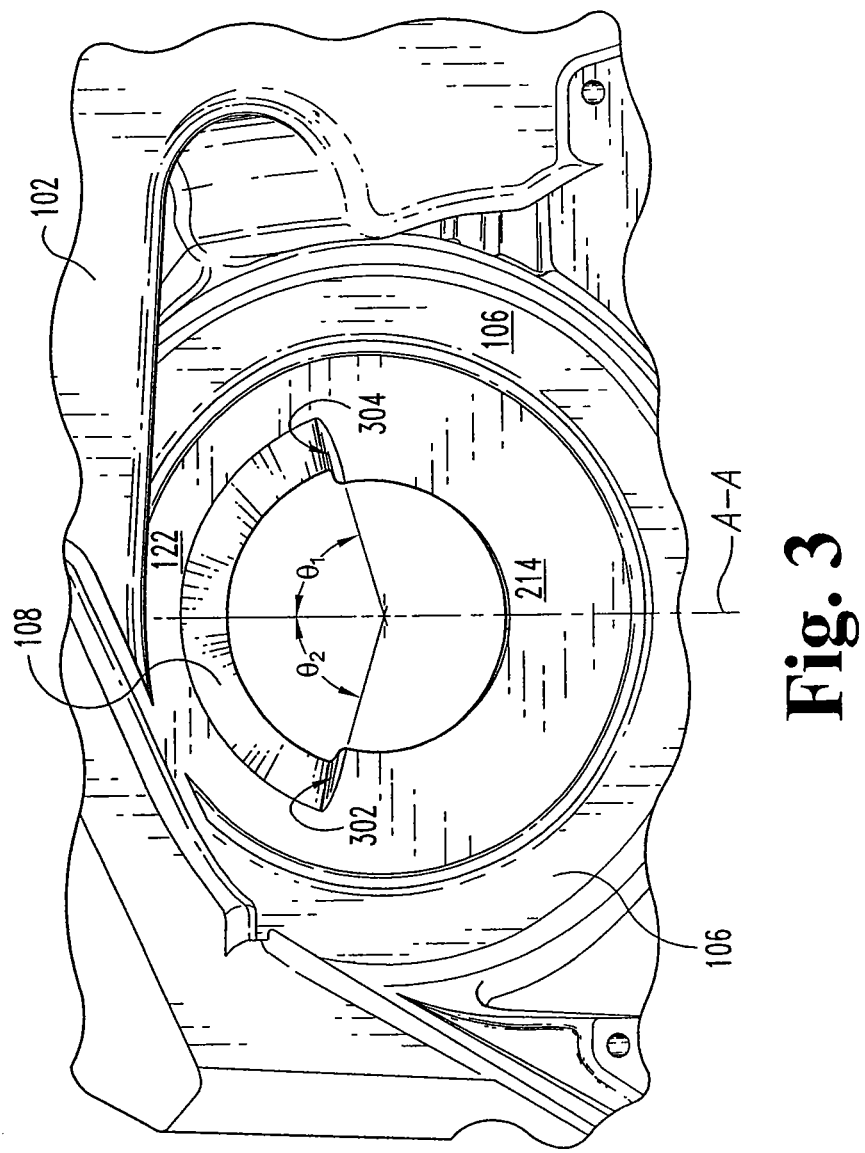
FIG. 3 is a front elevation view of a portion of the housing of FIG. 1.

Turning to FIG. 3, a closer view of a portion of the housing 102 and flow path is shown. As described above, the housing 102 includes side wall 106 that is substantially vertical with respect to the inner wall 104 and surface 108 that is angularly disposed or sloped with respect to the side wall 106. In at least one embodiment, the side wall 106 does not have to be entirely vertically-disposed with respect to the inner wall 104. In fact, the side wall 106 can include protrusions, recesses, and the like.

The surface 108 includes edges 302, 304 which can assist with fluid flow. The edges 302, 304 can have an angular disposition such that fluid is directed towards the collection area 110 (see FIG. 4) and collects behind the bearing 116. The surface 108 has a circumference less than 180°. The edges 302, 304 are disposed with respect to axis A-A at angles $\theta_2$, $\theta_1$, respectively. Angles $\theta_2$, $\theta_1$ can be substantially the same, or in other embodiments, the two angles can be different. For example, the angles $\theta_2$, $\theta_1$ can be less than 90°. In one embodiment, both angles $\theta_2$, $\theta_1$ are approximately 75°. Since $\theta_2$, $\theta_1$ are less than 90°, the edges 302, 304 direct fluid from the side wall 106 and surface 108 to the collection 110.

In addition, the side wall 106 is shown with an opening centrally defined therein (see FIG. 1). As described above, the bearing pilot 120 can be assembled in the housing 102 such that a portion of the bearing pilot 120 passes through the opening. The side wall 106, and in particular the front face 122, defines a surface 214 which is disposed near the bottom portion of the housing 102. The surface 214 is disposed on the opposite side of the side wall 106 from the collection area 110.

Figure 4:
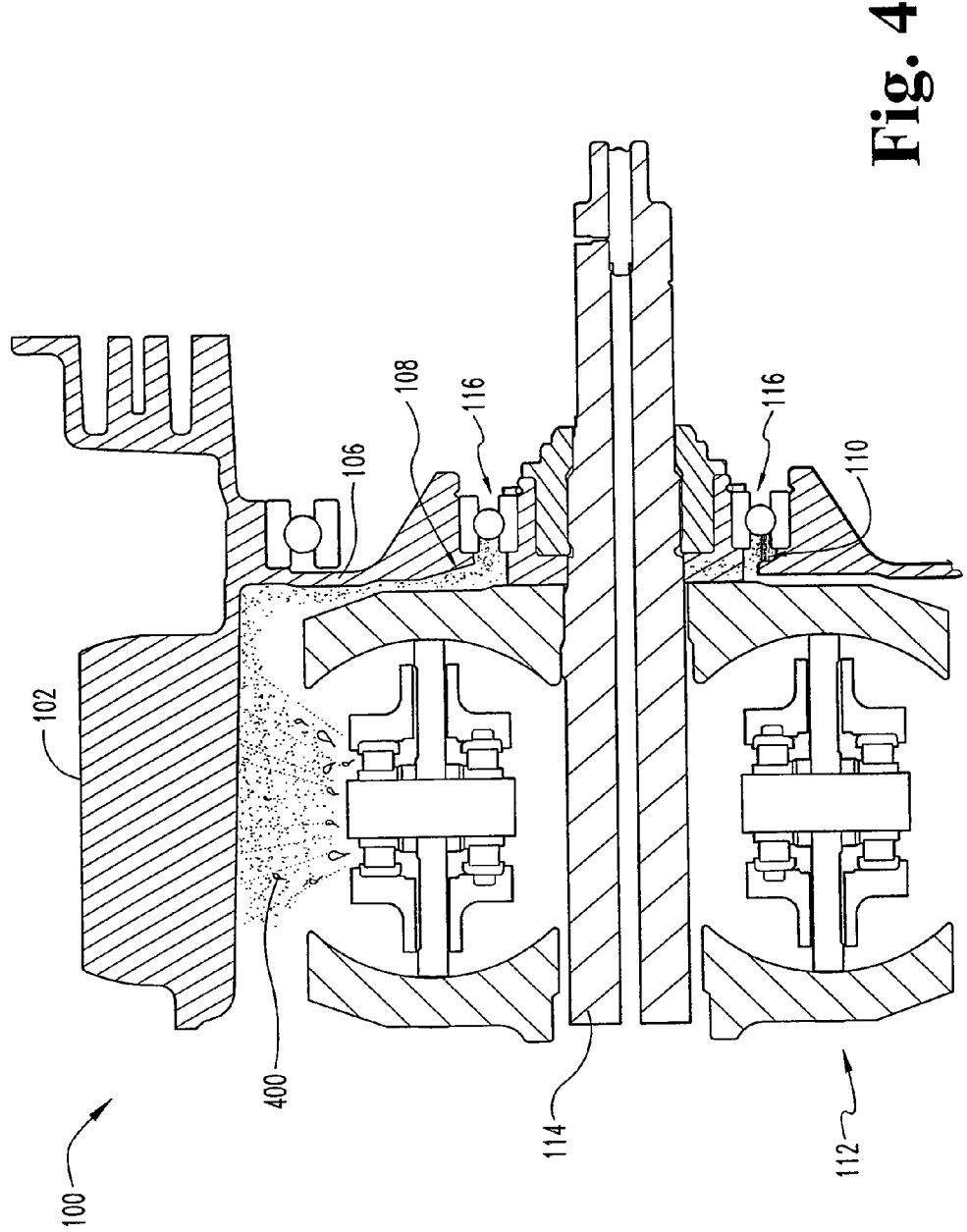
FIG. 4 is a side schematic view of the housing of FIG. 1.

Referring to the embodiment of FIG. 4, the variator 112 can function as a fluid source. In other embodiments, a pump or other device can function as a fluid source. During operation, the variator 112 dispenses fluid 400 in various directions. A portion of the fluid 400 is dispersed onto the inner wall 104 of the housing 102. Another portion of the fluid 400 can be dispersed directly onto the side wall 106. The portion of the fluid 400 that is dispersed onto the inner wall 104 can flow along the inner wall 104 until it is directed downwardly along the side wall 106. Fluid 400 flows along the inner wall 104 and/or side wall 106 such that a sufficient amount of the fluid 400 reaches the angularly disposed surface 108. At the intersection of the side wall 106 and surface 108, the fluid 400 continues flowing along the surface 108. Some of the fluid 400 reaches the top portion of the bearing 116 (as shown in FIG. 4), whereas the remaining amount of fluid 400 flows past surface 108 and is received in the collection area 110. As the fluid 400 is received in the collection area 110, the fluid 400 is fluidly coupled to the bearing 116. As such, the bearing 116 is sufficiently lubricated.

The above-described housing 102 therefore provides a direct fluid or lube path to the bearing 116. Fluid 400 is dispersed from a fluid source onto a housing wall, e.g., inner wall 104 or side wall 106. Gravity and the angular orientations of the housing walls allow a sufficient amount of fluid 400 to flow into contact with the bearing 116 and provide adequate lubrication. Advantageously, a lube path is not required to pass through holes or openings formed in a shaft. As a result, the transmission 100 can withstand higher torque and provide greater power to the vehicle.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A housing that encloses a bearing, comprising:
    an axis of rotation defined in the housing, the bearing disposed about the axis of rotation;
    a side wall upon which a lubricant is dispersed, the side wall having a sloped portion, where the side wall protrudes radially inward of the housing and perpendicular to the axis of rotation to form a first face on one side of the side wall and a second face on an opposite side thereof;
    a collection area fluidly associated with the side wall, the collection area defined at least partially by the second face; and
    a fluid path integral with the side wall;
    wherein, the fluid path is configured to direct the lubricant into the collection area;
    further wherein the first face and second face are disposed within the housing, and the first face and second face are oriented in substantially opposite directions.

2. The housing of claim 1, wherein the collection area is fluidly coupled to the bearing.

3. The housing of claim 1, wherein the collection area and the sloped portion are formed on opposite sides of the side wall.

4. The housing of claim 1, wherein the sloped portion is angularly disposed toward the collection area.

5. The housing of claim 1, wherein the first face forms a substantially vertical face.

6. The housing of claim 5, wherein the sloped portion is disposed between 180 degrees and 225 degrees from the substantially vertical face.

7. The housing of claim 6, wherein the sloped portion is angularly disposed about 195 degrees from the substantially vertical face.

8. The housing of claim 5, wherein the first face is substantially flat.

9. The housing of claim 8, wherein the sloped portion is depressed inwardly from the first face.

10. The housing of claim 9, wherein the sloped portion is depressed inwardly along less than about 180 degrees of the face.

11. The housing of claim 10, wherein the sloped portion is depressed inwardly along about 150 degrees of the front face.

12. The housing of claim 5, wherein a plurality of edges are defined between the sloped portion and the first face, the plurality of edges being angularly disposed from the sloped portion to direct the lubricant towards the collection area.

13. The housing of claim 1, wherein the sloped portion directs the lubricant from the side wall to the collection area.

14. The housing of claim 1, wherein the sloped portion is formed near the top of the side wall and the collection area is formed near the bottom of the side wall.

15. A housing of a transmission for lubricating a bearing, comprising:
    a body having a first end and a second end, where an axis of rotation passes through the body between at least the first end and the second end;
    an inner wall of the body defining an internal region therein, the inner wall forming an inner surface configured to receive fluid from a fluid source disposed in the internal region;
    a sidewall integrally formed with and disposed perpendicular to the axis of rotation, the sidewall protruding from the inner wall into the internal region, wherein the sidewall forms a first face oriented towards the first end of the body and a second face oriented towards the second end thereof; and
    a collection area at least partially defined by the second face, the collection area defining a recess in the sidewall configured to collect the fluid therein for lubricating the bearing.

16. The housing of claim 15, wherein the bearing is disposed in the internal region and the second face is substantially oriented towards the bearing.

17. The housing of claim 16, wherein the collection area is defined by the second face and the bearing.

18. The housing of claim 15, wherein the collection area forms a substantially L-shaped cross-section.

19. The housing of claim 15, wherein the sidewall includes a first surface and a second surface, the first surface being substantially perpendicular to the inner surface and the second surface being angularly sloped relative to the first surface.

20. The housing of claim 19, further comprising an opening defined in the sidewall, wherein the second surface and the collection area are separated from one another by the opening.

21. The housing of claim 19, wherein the second surface is radially and angularly defined in the sidewall.

22. The housing of claim 21, wherein the second surface comprises a first angular edge and a second angular edge, the first and second angular edges adapted to direct fluid from the first face towards the second face.

23. The housing of claim 21, wherein the second surface is angularly defined in the sidewall by approximately 150° or less.

24. The housing of claim 21, wherein the second surface is angularly defined in the sidewall by approximately 180° or less.

25. The housing of claim 19, wherein the second surface is angularly disposed in a direction towards the second end.

26. A fluid directing housing located radially about an article for lubrication comprising:
   an opening defined in the housing through which an axis of rotation passes;
   a first face and a second face of a wall defined by the housing, the first face and the second face disposed in opposite directions relative to each other;
   a first plane that extends perpendicular to the axis of rotation and is defined by a portion of the first face;
   a bearing disposed within the opening about the axis of rotation, the bearing being axially offset from the first plane;
   an angularly disposed surface of the wall that is radially oriented about the axis of rotation, the angularly disposed surface having a length defined at the first plane and extending towards the bearing as it becomes radially closer to the axis of rotation; and
   a collection area located between the first plane and the bearing, the collection area being defined by the second face and the bearing.

27. The fluid directing housing of claim 26, wherein the angularly disposed surface is at an upper portion of the opening.

28. The fluid directing housing of claim 26, further comprising a bearing retention lip along the opening defined by the housing.

29. The fluid directing housing of claim 28, wherein the bearing retention lip extends radially inward from the opening defined in the housing to prevent the bearing from moving into axial alignment with the first plane.

30. The fluid directing housing of claim 26, wherein the angularly disposed surface is an arc-shaped cross-section partially defined in the first face that is less than 180 degrees.

31. The fluid directing housing of claim 30, wherein the arc-shaped cross-section of the angularly disposed surface begins at a first edge and terminates at a second edge.

32. The fluid directing housing of claim 31, wherein the first edge and the second edge direct fluid from the first face to the collection area.

33. The fluid directing housing of claim 26, wherein the second face of the collection area is defined by a radial lip about the opening defined in the housing that separates the first plane from the collection area.

34. The fluid directing housing of claim 33, wherein the radial lip has an arc-shaped cross-section and encircles at least 180 degrees of the opening.

* * * * *